US008914880B2

(12) United States Patent
Lee

(10) Patent No.: US 8,914,880 B2
(45) Date of Patent: Dec. 16, 2014

(54) MECHANISM TO CALCULATE PROBABILITY OF A CYBER SECURITY INCIDENT

(75) Inventor: Thomas Elliott Lee, Los Altos, CA (US)

(73) Assignee: VivoSecurity, Inc.

( * ) Notice: Subject to any disclaimer, the term of this patent is extended or adjusted under 35 U.S.C. 154(b) by 0 days.

(21) Appl. No.: 13/491,605

(22) Filed: Jun. 8, 2012

(65) Prior Publication Data
US 2013/0333043 A1 Dec. 12, 2013

(51) Int. Cl.
G06F 11/30 (2006.01)
G06F 7/04 (2006.01)

(52) U.S. Cl.
USPC .......................................................... 726/22

(58) Field of Classification Search
None
See application file for complete search history.

(56) References Cited

U.S. PATENT DOCUMENTS

| 7,093,132 | B2* | 8/2006 | Aho et al. ..................... 713/176 |
|---|---|---|---|
| 7,228,565 | B2* | 6/2007 | Wolff et al. ..................... 726/24 |
| 7,346,927 | B2* | 3/2008 | Hillmer ........................... 726/22 |
| 7,398,399 | B2* | 7/2008 | Palliyil et al. ................. 713/187 |
| 7,475,427 | B2* | 1/2009 | Palliyil et al. ................... 726/24 |
| 7,519,726 | B2* | 4/2009 | Palliyil et al. ................. 709/232 |
| 7,549,061 | B2* | 6/2009 | Nonaka et al. ................ 713/193 |
| 7,689,835 | B2* | 3/2010 | Palliyil et al. ................. 713/187 |
| 7,752,669 | B2* | 7/2010 | Palliyil et al. ................... 726/24 |
| 7,774,451 | B1* | 8/2010 | Bogorad et al. ............. 709/223 |
| 7,900,062 | B2* | 3/2011 | Nonaka et al. ................ 713/193 |
| 7,975,305 | B2* | 7/2011 | Rubin et al. .................... 726/25 |
| 8,151,355 | B2* | 4/2012 | Fossen et al. .................. 726/24 |
| 8,261,084 | B2* | 9/2012 | Nonaka et al. ................ 713/176 |
| 8,281,399 | B1* | 10/2012 | Chen et al. ...................... 726/24 |
| 8,392,722 | B2* | 3/2013 | Cho et al. ..................... 713/189 |
| 8,646,079 | B2* | 2/2014 | Chen et al. ..................... 726/23 |
| 2010/0313035 | A1* | 12/2010 | Turbin et al. .................. 713/189 |
| 2011/0219450 | A1* | 9/2011 | McDougal et al. ............ 726/23 |
| 2011/0219451 | A1* | 9/2011 | McDougal et al. ............ 726/23 |
| 2012/0079596 | A1* | 3/2012 | Thomas et al. ................ 726/24 |
| 2012/0090031 | A1* | 4/2012 | Fossen et al. .................. 726/24 |
| 2014/0082729 | A1* | 3/2014 | Shim et al. ..................... 726/23 |

* cited by examiner

Primary Examiner — Christopher Revak
(74) Attorney, Agent, or Firm — Stephen J. LeBlanc, Esq.

(57) ABSTRACT

An Archetype Software Invention which calculates the probability of a cyber security incident for a given computer by correlating the distribution of computer program files with the occurrences of security incidents across a large number of computers.

12 Claims, 2 Drawing Sheets

Database Schema

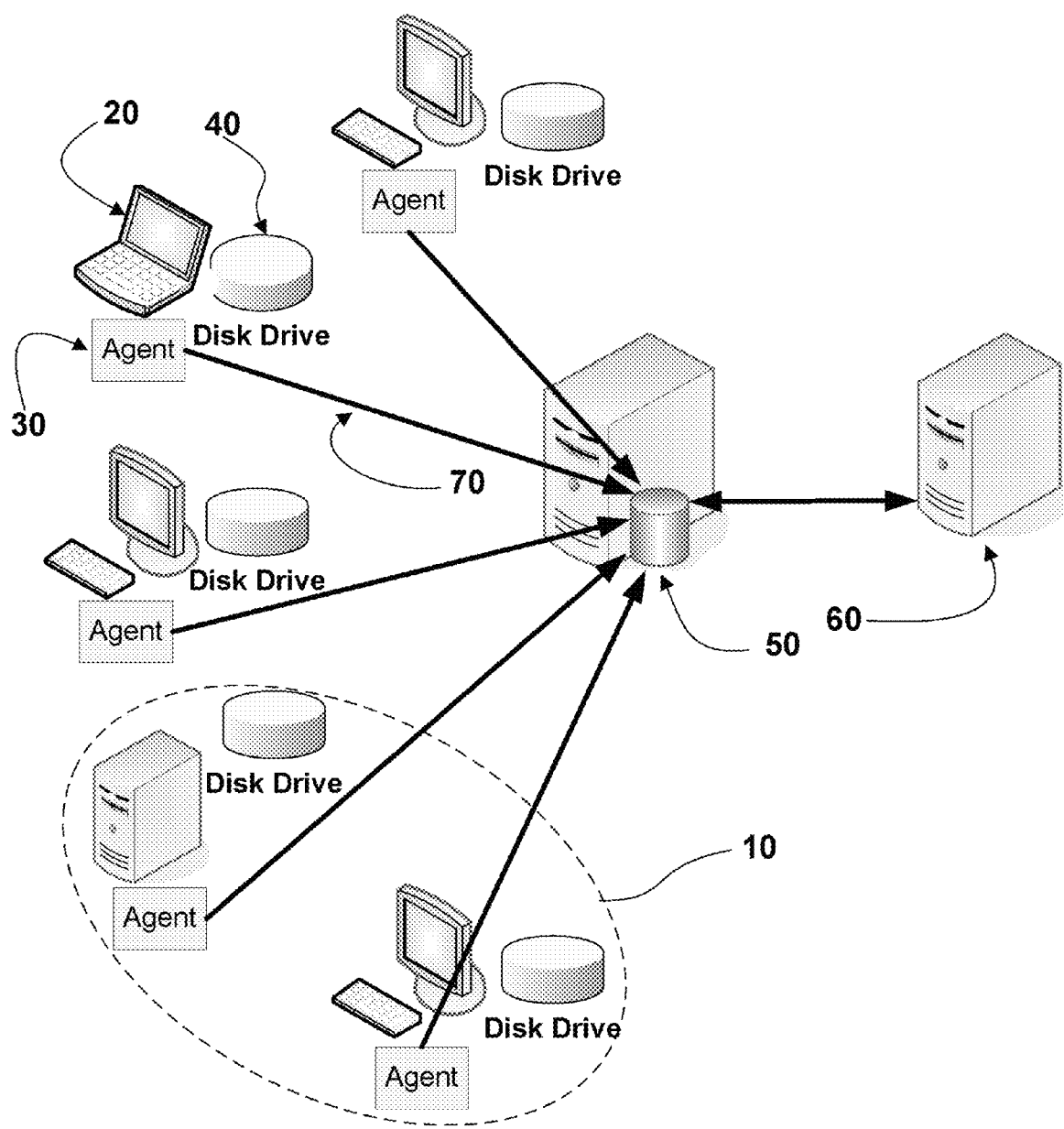
Figure 1, Collection of Computers and Database

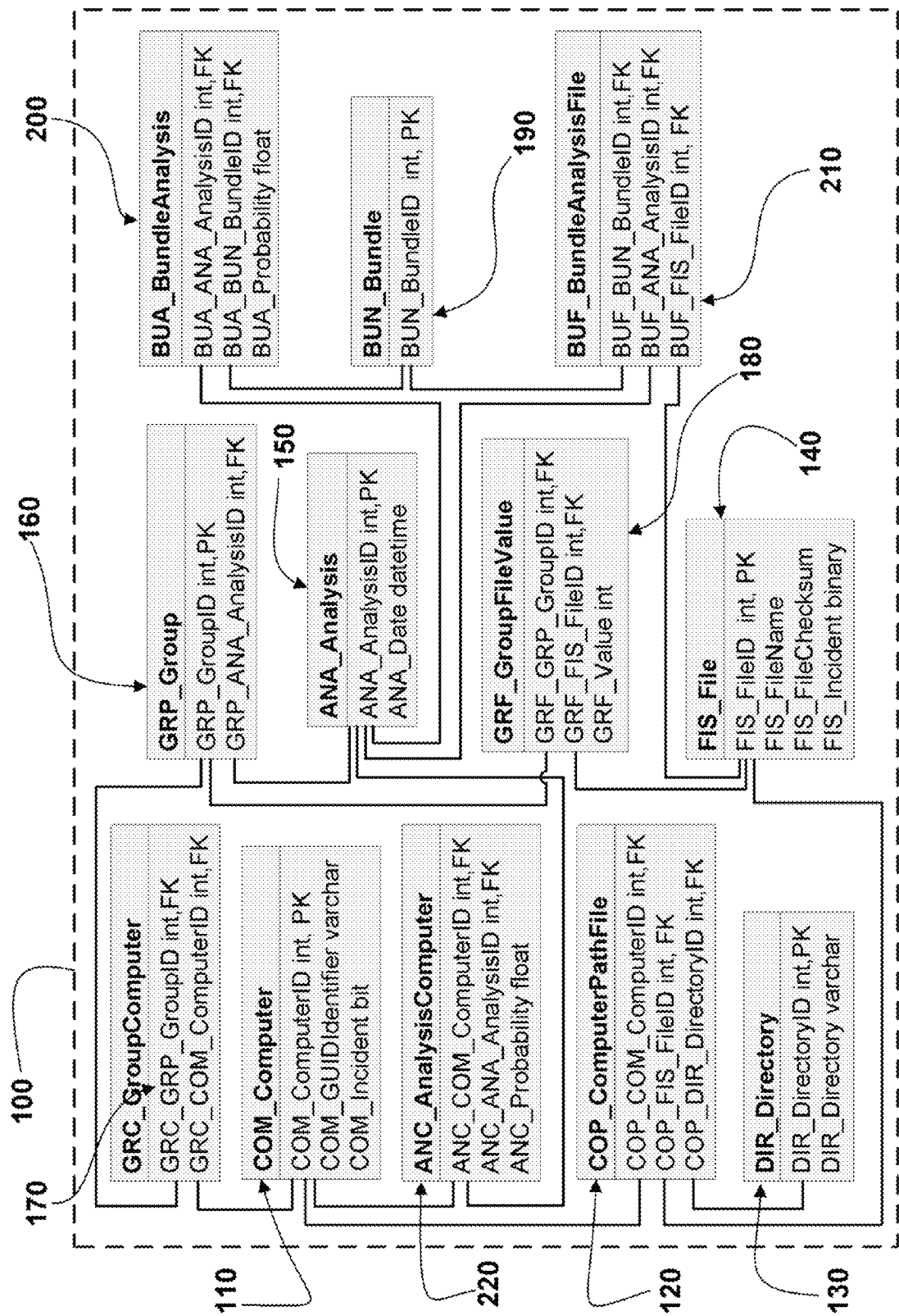
Figure 2, Database Schema

MECHANISM TO CALCULATE PROBABILITY OF A CYBER SECURITY INCIDENT

BACKGROUND

1. Field of Invention

This Invention relates to computer applications which will protect a corporate enterprise from security incidents, including unauthorized intrusions and malicious computer programs.

2. Description of Prior Art

The foundation of a good cyber security policy for any corporate or government enterprise is a security risk assessment: the probability of a security incident and the impact if it were to occur. The amount of risk that can be tolerated and how to mitigate the risk can be determined based upon the risk assessment.

A security risk assessment is difficult to perform, due in part to the difficulty of assessing probability that a security incident could occur. Current methods amount to a subjective rating of known vulnerabilities for an enterprise. ISO 2700 standards even recommend that several people perform the analysis and that their opinions be averaged. Current methods are also manual, laborious and time consuming to perform, and are therefore performed infrequently.

OBJECTS AND ADVANTAGES

Accordingly, we claim the following as our objects and advantages of our invention:
1. To objectively estimate the probability of a security incident based upon a statistical correlation of program files present on a computer with security incidents
2. To automatically and continuously calculate the probability of a security incident,

BRIEF DESCRIPTION OF THE DRAWINGS

FIG. 1, System diagram
FIG. 2, Database Schema of the system.

LIST OF OBJECTS IN FIGURES

10 Computers which have been previously involved in a security incident
20 A computer which is part of the collection of computers under analysis
30 The software agent which collects information about program files
40 File system of the computer
50 Common database with information about program files and computers
60 Computer to analyze data in common database and calculate probability
100 Schema for database 50
110 Database table containing identification information for each computer within the collection analyzed
120 Database table joining computers 110 with program files 140 and directories 130
130 Database table containing the names of all directories on all computers 110
140 Database table containing information on all program files on all computers 110
150 Database table containing primary keys and time of each analysis
160 Database table containing primary keys for groups used to analyze program file distributions in order to form program file bundles
170 Database table linking computers to groups
180 Database table containing the number of times each program file is found within the computers within each group, used to form program file bundles
190 Database table containing primary keys for program file bundles
200 Database table containing probability values for each program bundle at the time of an analysis
210 Database table linking program files 140 to bundles 190 for any particular analysis 150
220 Database table containing the final result of probability values for each computer 110 at the time of each analysis 150

DESCRIPTION OF THE PREFERRED EMBODIMENTS

Probability of a security breach is calculated by analysis of program files present on a collection of computers. The collection of computers is large enough that some of the computers have previously been involved in a security incident 10, for example, infected by malware. Each computer 20 has a software agent 30 which reads program files on disk drives 40 attached to the computer. The agent maybe a Windows NT Service in the case of a Windows operating system, or a demon in the case of a Linux operating system. The agent performs a checksum calculation and sends information on the program file name, directory and checksum to a database 50 with schema 100 over the internet using, for example a TCPIP or HTTP protocol. A computer 60 reads the information in the database, calculates probability for each computer, and saves the information back into the database. Probability for each computer can then be read from the database in order to perform a risk assessment.

Operation

The Invention utilizes a statistical approach when analyzing program files. It is assumed that there are enough computers analyzed that a sufficient number of the computers have previously been involved in a security incident 10 so that an accurate statistical analysis can be perform.

Computer Registration

The operations described here, which are performed by the Agent program 30 located on each networked computer 20 can be performed within many different operating systems: Linux™, Unix™, Mac OS™, various Windows OS™, Google Android OS™, for example, but will be described here for the Windows 7™ Operating system.

The very first time the Agent program 30 starts, it calculates a unique number (GUID) which it then stores locally, for example, in the registry. The new GUID will be stored in the COM_GUIDIdentifier column of the COM_Computer table 110. This GUID will be used in all communications from the Agent to the Database Publisher to identify the computer.

File Registration

The principle task of the Agent program is to insure that the information in tables 120, 130, and 140 accurately represents the program files which can be found in the computer's file system.

To accomplish this, the Agent can periodically inventory the file system. The Agent begins an inventory by connecting to the database and downloading a local list of program files and directories. This list contains filename, file size, and file checksum, and directory for all the program files which were present when the Agent program last ran. This list can be generated by joining the COM_Computer table with the COP_ComputerPathFile 120, the FIS_File 140 and DIR_Directory 130 table and filtering, using the COM_GUIDIdentifier column as follows:

---
Script 1, Return a local file list
---
```
SELECT
          COP__COM__ComputerID
          ,FIS__FileID
          ,DIR__DirectoryID
          ,FIS__FileName
          ,FIS__FileSize
          ,FIS__FileChecksum
          ,DIR__Directory
FROM      COP__ComputerPathFile
          LEFT INNER JOIN FIS__File
              ON FIS__FileID = COP__FIS__FileID
          LEFT INNER JOIN DIR__Directory
              ON DIR__DirectoryID=COP__DIR__DirectoryID
          LEFT INNER JOIN COM__Computer
              ON COM__ComputerID=COP__COM__ComputerID
WHERE
          COM__GUIDIndentifier = @GUID
```
---

Next, after the local list is downloaded, the Agent performs an inventory of the file system, comparing the program files found with program files in the list. For program files found in the file system but which are not in the list, the Agent creates an entry in the COP_ComputerPathFile table which links the corresponding file entry in the FIS_File table, the corresponding directory in the DIR_Directory table and the corresponding computer in the COM_Computer table. If the file or directory have not yet been registered, the Agent can first create the FIS_File and DIR_Directory entries.

For entries in the list that cannot be found in the file system, the Agent can delete the corresponding COP_ComputerPathFile table.

Security Incidents

When a computer is involved in a security incident, the COM_Incident bit can be set for that computer in the COM_Computer table. A security incident might include a detected break-in or malicious software which is found within the file system. Malicious software might be found by periodically scanning the FIS_File table for known malware, then identifying the computers which contain that software by linking the FIS_File table to the COM_Computer table though the COP_ComputerPathFile table and filtering by the FIS_FileID for known malware.

Once the COM_Incident bit is set, it will not be unset even if the malicious file is removed from the computer.

Analysis: Calculate Group Values Each File

With program files cataloged and computers involved in security incidents identified, a statistically based analysis is performed. Each time an analysis is performed, a new row is added to the ANA_Analysis table 150 and the ANA_Date is set to the current date and time.

Analysis begins by dividing computers into groups of one or more computers. The purpose of the groups is identify files with identical distribution patterns so that these files can be treated as a single program collection or bundle during the correlation analysis. Groups can contain more computers to speed analysis or fewer computers to increase sensitivity in identify program files with similar distribution profiles.

When a group is formed, a row is added to the GRP_Group table 160 with a link to the ANA_Analysis table through the GRP_ANA_AnalysisID foreign key. A row is entered into the GRC_GroupComputer table 170 for each computer which is part of this group, thus linking the computer to the group.

The analysis continues by counting the number of times each file can be found in each group. For each file, a row is entered in the GRF_GroupFileValue table 180 and GRF_Value is set to the number of times the file is found on the computers within that group. Because many files can be found multiple times on a computer, it is essential to count a file no more than once-per-computer. The following two step SQL script can be used to set the value for GRF_Value if a row has already been inserted in the GRF_GroupFileValue table, where @GroupID and @FileID are variables for the GRP_Group and FIS_File table primary keys:

---
Script 3, Calculate GRF_Value
---
```
SELECT DISTINCT
    COP__FIS__FileID
    INTO #TempCountFile
FROM
    GRC__GroupComputer
    INNER JOIN COP__ComputerPathFile
        ON COP__COM__ComputerID=GRC__COM__ComputerID
WHERE
    GRC__GRP__GroupID=@GroupID
    AND COP__FIS__FileID=@FileID
UPDATE
    GRF__GroupFileValue
SET GRF__Value = (        SELECT COUNT (COP__FIS__FileID)
                          FROM #TempCountFile)
WHERE
    GRF__FIS__FileID=@FileID
    AND GRF__GRP__GroupID=@GroupID
```
---

For a given file and a given analysis, the collection of GRF_Value values form the distribution profile.

Analysis: Organize Files into Program File Bundles

Once GRF_Value values are calculated for each group for each file, the files are ready to be orgainized into Program File Bundles. A Program Bundle here connotes a collection of program files with the same distribution profile.

Similarity in distribution profiles is evaluated using Equation 1, where $d_{ab}$ is the distance between files $f_a$ and $f_b$, N is the number of groups, $G_{nf_a}$ and $G_{nf_b}$ are the GRF_Value values for group n, file $f_a$ and file $f_b$ respectively.

$$d_{ab} = \sqrt{\sum_{n=0}^{N}(G_{nf_a} - G_{nf_b})^2} ,$$

Equation 1

The following SQL View can be used to calculate Equation 1, and allows filtering by file and analysis.

---
Script 4, Calculate Distance between Files
---
```
CREATE VIEW v__DistanceBetweenFiles
AS
    SELECT
        FileOne.GRP__ANA__AnalysisID
        ,FileOne.GRF__FIA__FileSignatureID AS
        GRF__FileOne__FIA__FileSignatureID
        ,FileTwo.GRF__FIA__FileSignatureID AS
        GRF__FileTwo__FIA__FileSignatureID
        ,sqrt( sum( (FileTwo.GRF__Value-FileOne.GRF__Value) *
            (FileTwo.GRF__Value-FileOne.GRF__Value) ) ) AS
            Distance
    FROM
        GRF__GroupFileValue FileOne
        ,GRF__GroupFileValue FileTwo
        ,GRP__Group
    WHERE
```

-continued

Script 4, Calculate Distance between Files

FileTwo.GRF__GRP__GroupID=FileOne.GRF__GRP__GroupID
and GRP__GroupID=FileOne.GRF__GRP__GroupID
GROUP BY
    FileOne.GRF__ANA__AnalysisID,
    FileOne.GRF__FIA__FileSignatureID,
    FileTwo.GRF__FIA__FileSignatureID When a set of files is found where $d_{ab}$ is zero between each file, either a new row is inserted in the BUN_Bundle table 190, or an existing Program File Bundle is found where at least 50% of the files are deemed in common. A new row is inserted in the BUA_BundleAnalysis table 200, and new rows are inserted into the BUF_BundleAnalysisFile table 210, with the primary key of a new or existing Program Bundle 190, the primary keys of the files 140, and the primary key of the current analysis 150. In this way, each Program File Bundle will contain one or more files for one or more analysis.

Analysis: Calculate Probability for Program File Bundles

A probability is calculated for each Program File Bundle, where $P_{b,a}$ is the probability value for bundle b, at the time of analysis a; $I_{b,a}$ is the number of once infected computers that have bundle b at the time of analysis a (i.e. computers where the COM_Incident bit has been set to 1 and that also contain the files which form bundle b), $C_{b,a}$ is the total number of computers with bundle b at the time of analysis a and $I_a$ is the total number of once infected computers at the time of analysis a (i.e. all computers where the COM_Incident bit has been set to 1), $C_a$ is the total number of computers at the time of analysis a, and $\overline{C}_{B,a}$ is the average number of computers per bundle, across all bundles B at the time of analysis a.

$$P_{b,a} = \left(\frac{I_{b,a}}{C_{b,a}} - \frac{I_a}{C_a}\right) \times \frac{C_{b,a}}{\overline{C}_{B,a}}, \quad \text{Equation 2}$$

Equation 2 can be understood by replacing ratios with D, E and F (equation 3). Ratio D is the number of infected to total computers for bundle b, ratio E is the ratio of once infected to all computers. When a bundle has a better (smaller) ratio A than computers overall E, then D−E will be negative and the affect of the bundle will be to lower probability of infection for any computer where it appears. Ratio F, which is the number of computers where bundle b appears relative to the avearage for a bundle, is a measure of how widely distributed a bundle is, thus giving more weight to a bundle which is more widely distributed.

$$P_{b,a} = (D-E) \times F \quad \text{Equation 3,}$$

$P_{a,b}$ is then calculated for all bundles b for analysis a, and the BUA_Probability value is updated in table BUA_Bundle-Analysis table 200.

Analysis: Calculate Probability for Computers

Finally, a probability can be calculated for each computer. The probability for a computer c is calculated by summing the probabilities of all Program File Bundles which can be found on a computer at the time of analysis a (Equation 4).

$$P_{c,a} = \sum_{c,a} P_{b,a} \quad \text{Equation 4}$$

The $P_{c,a}$ value can be saved in the ANC_AnalysisComputer table 220 as the ANC_Probability value, providing a way of trending probability values for any particular computer.

What is claimed:

1. A method for calculating the probability of a cyber security incident for a computer within a group of computers comprising:
   a. collecting program file names, checksums, and locations within file systems on one or more computers in the group of computers, where an identity of a program file is determined by a unique file identifier of that program file;
   b. storing in an electronic memory the unique file identifier for each program file, a unique computer identifier for each computer;
   c. storing in an electronic memory for each program file a list of computer identifiers on which the file was found;
   d. determining a plurality of program file bundles by comparing the lists of computer identifiers for program files and bundling program files with similar computer lists;
   e. associating computers with program file bundles by associating any computer that contained any program file in a bundle with that bundle;
   f. accessing security incident history data for each computer such that each unique computer identifier is associated with data indicating a history of security incidents on that computer;
   g. calculating a bundle probability value for a program file bundles by examining computers associated with that bundle and determining a value based on the ratio of those computers that have previously or currently been involved in a security incident to those computers never involved in a security,
   h. calculating a probability of a cyber security incident for the computer by summing probabilities values for one or more program file bundles present on the computer; and
   i. reporting or outputting the probability of a cyber security incident for the computer.

2. The method of claim 1 wherein the function for calculating the bundle probability value for one or more program file bundles is:

$$P_{b,a} = \left(\frac{I_{b,a}}{C_{b,a}} - \frac{I_a}{C_a}\right) \times \frac{C_{b,a}}{\overline{C}_{B,a}}$$

where $P_{b,a}$ is the probability value for a program file bundle b, at the time of an analysis a, wherein analysis a comprises identifying program file bundles, calculating their bundle probability values, and storing an identity and bundle probability value for one or more of the program file bundles;

where $I_{b,a}$ is a number of said computers previously or currently involved in a security incident and that have program file bundle b at the time of analysis a, $C_{b,a}$ is a total number of computers in the group with program file bundle b at the time of analysis a and $I_a$ is a total number of the computers previously or currently involved in a security incident at the time of analysis a, $C_a$ is a total number of computers in the group at the time of analysis a, and $\overline{C}_{B,a}$ is an average number of computers per program file bundle, across all program file bundles B at the time of analysis a.

3. The method of claim 1 further wherein calculating the bundle probability value for a program file bundle comprises:

determining a ratio of the number of computers previously or currently involved in a security incident and that have the bundle, to the total number of computers, subtracting a ratio of a total number of computers in the group previously or currently involved in a security incident to the total number of computers in the group;

multiplying the result by the ratio of the total number of computers with the bundle to the average number of computers per bundle across all bundles;

wherein organizing the identities of said program files into program file bundles based upon similar distribution comprises:

dividing the computers into N cells, with one or more said computers in each cell, determining values that are the number of times each identified program file is found by step (a) counting an identified program file no more than once per computer, counting said program file once if it was ever installed on a computer, even if it has been removed;

calculating a distance value between pairs of program files where the distance value is a function of the collection of values for each said program file, determining program file bundles by bundling program files that have a similar distribution.

4. The method for calculating the probability of a cyber security incident of claim 1 wherein the function $F_1$ is $$d_{ab} = \sqrt{\sum_{n=0}^{N} (G_{nf_a} - G_{nf_b})^2},$$

and where N is a total number of computer cells.

5. The method of claim 1 where having a program file comprises having the file now or during any specified previous time.

6. A method for calculating the probability of a cyber security incident for a computer within a group of computers comprising:

a. collecting program file names, checksums, and locations within file systems on one or more computers in the group of computers, where an identity of a program file is determined by a unique file identifier of that program file;

b. storing in an electronic memory the unique file identifier for each program file, a unique computer identifier for each computer;

c. storing in an electronic memory for each program file a list of computer identifiers on which the file was found;

d. determining a plurality of program file bundles by comparing the lists of computer identifiers for program files and bundling program files with similar computer lists;

e. associating computers with program file bundles by associating any computer that contained any program file in a bundle with that bundle;

f. accessing security incident history data for each computer such that each unique computer identifier is associated with data indicating a history of security incidents on that computer;

g. calculating a bundle probability value for a program file bundles by examining computers associated with that bundle and determining a value based on the ratio of those computers that have previously or currently been involved in a security incident to those computers never involved in a security, h. calculating a probability of a cyber security incident for the computer by summing probabilities values for one or more program file bundles present on the computer; and i. reporting or outputting; further wherein the function for calculating the bundle probability value for one or more program file bundles is:

$$P_{b,a} = \left( \frac{I_{b,a}}{C_{b,a}} - \frac{I_a}{C_a} \right) \times \frac{C_{b,a}}{\overline{C}_{B,a}}$$

where $P_{b,a}$ is the probability value for a program file bundle b, at the time of an analysis a, wherein analysis a comprises identifying program file bundles, calculating their bundle probability values, and storing an identity and bundle probability value for one or more of the program file bundles;

where $I_{b,a}$ is a number of said computers previously or currently involved in a security incident and that have program file bundle b at the time of analysis a, $C_{b,a}$ is a total number of computers in the group with program file bundle b at the time of analysis a and $I_a$ is a total number of the computers previously or currently involved in a security incident at the time of analysis a, $C_a$ is a total number of computers in the group at the time of analysis a, and $\overline{C}_{B,a}$ is an average number of computers per program file bundle, across all program file bundles B at the time of analysis a; wherein said organizing the identities of said program files into program file bundles based upon similar distribution across said collection of computers comprises:

a. dividing the computers into N cells, with one or more computers in each said cell, b. obtaining a collection of values $\{G_{nf}\}$ that are the number of times a program file f is found within cell n, counting an identified program file no more than once per computer even if it is found multiple times on the computer, and counting said program file once if it was ever installed on a computer, even if it has been removed from the computer, c. calculating a distance value $d_{ab}=F_1(\{G_{nf_a}\},\{G_{nf_b}\})$, between possible pairs of program files, symbolized by $f_a$ and $f_b$, where the distance value is some function $F_1$ of the collection of $\{G_{nf}\}$ values for each program file, d. determining program file bundles, where one or more of the program file bundles comprises component program files for which the distance $d_{ab}$ between any two is zero or below a threshold.

7. The method for calculating the probability of a cyber security incident of claim 6 wherein the function $F_1$ is $$d_{ab} = \sqrt{\sum_{n=0}^{N} (G_{nf_a} - G_{nf_b})^2},$$

and where N is a total number of computer cells.

8. A method for calculating probability of a security incident for a computer within a group of computers, the method comprising:

determining presence of unique program files within the group of computers by accessing files on computers and for each unique program file storing a list of computers upon which that file is found;

determining program file bundles by identifying program files similarly distributed within the group of computers by examining the list of computers stored for each program file;

calculating a bundle incident probability value for a program file bundle by examining the list of computers upon which said bundle is present and determining which computers were previously or currently involved in a security incident and which computers were never involved in a security incident and determining a ratio of such computers that containing the bundle; and summing bundle probability values for bundles present on a particular computer to determine a computer security incident value for that computer.

9. The method of claim 8, wherein calculating a bundle incident probability comprises:

determining a ratio of the number of computers having a security incident that have the bundle to the total number of computers that have the bundle, subtracting a ratio of a total number of computers in the group having a security incident to the total number of computers in the group;

multiplying the result by the ratio of the total number of computers with the bundle to the average number of computers per bundle across all bundles.

10. The method of claim 9 wherein bundle probability values are generally determined according to:

$$P_{b,a} = \left( \frac{I_{b,a}}{C_{b,a}} - \frac{I_a}{C_a} \right) \times \frac{C_{b,a}}{\overline{C}_{B,a}}$$

where $P_{b,a}$ is the probability value for a Program File Bundle b, at the time of an analysis a, wherein analysis a comprises identifying Program File Bundles, calculating their bundle probability values, and storing an identity and bundle probability value for one or more of the Program File Bundles;

where $I_{b,a}$ is a number of said computers previously or currently involved in a security incident and that have Program File Bundle b at the time of analysis a, $C_{b,a}$ is a total number of computers in the group with Program File Bundle b at the time of analysis a and $I_a$ is a total number of the computers previously or currently involved in a security incident at the time of analysis a, $C_a$ is a total number of computers in the group at the time of analysis a, and $\overline{C}_{B,a}$ is an average number of computers per Program File Bundle, across all Program File Bundles B at the time of analysis a.

11. The method of claim 8, wherein determining program file bundles comprises:

determining for a program file the identities of computers or subgroups of computers with that program file;

calculating a distance value between pairs of program files where the distance value represents similarity or difference in the distribution of program files is the computers; and bundling program files that have a similar distribution.

12. The method of claim 9 wherein said means for organizing the identities of said program files into Program File Bundles based upon similar distribution across said collection of computers comprising:

a. dividing the computers into N cells, with one or more computers in each said cell, b. obtaining a collection of values $\{G_{nf}\}$ that are the number of times a program file f is found within cell n, counting an identified program file no more than once per computer even if it is found multiple on the computer, and counting said program file once if it was ever installed on a computer, even if it has been removed from the computer, c. calculating a distance value $d_{ab}=F_1(\{G_{nf_a}\},\{G_{nf_b}\})$, between possible pairs of program files, symbolized by $f_a$ and $f_b$, where the distance value is some function $F_1$ of the collection of $\{G_{nf}\}$ values for each program file, d. determining Program File Bundles, where one or more of the Program File Bundles comprises component program files for which the distance $d_{ab}$ between any two is zero or below a threshold.

* * * * *